US007412408B1

(12) United States Patent
Palazzo (10) Patent No.: US 7,412,408 B1
(45) Date of Patent: Aug. 12, 2008

(54) METHOD FOR CONSOLIDATING ORDERS

(75) Inventor: Craig M. Palazzo, Grand Rapids, MI (US)

(73) Assignee: Alticor Investments Inc., Ada, MI (US)

( * ) Notice: Subject to any disclaimer, the term of this patent is extended or adjusted under 35 U.S.C. 154(b) by 306 days.

(21) Appl. No.: 10/886,410

(22) Filed: Jul. 7, 2004

(51) Int. Cl.
*G06Q 30/00* (2006.01)
*G06F 17/30* (2006.01)

(52) U.S. Cl. .............................. 705/26; 705/1; 705/27; 705/28; 705/29

(58) Field of Classification Search ...................... 705/1, 705/10, 26–29; 707/9
See application file for complete search history.

(56) References Cited

U.S. PATENT DOCUMENTS

| | | | |
|---|---|---|---|
| 5,672,039 A | 9/1997 | Perry et al. | |
| 5,794,219 A | 8/1998 | Brown | |
| 5,970,475 A * | 10/1999 | Barnes et al. ................. | 705/27 |
| 6,167,378 A | 12/2000 | Webber, Jr. | |
| 6,269,343 B1 * | 7/2001 | Pallakoff ...................... | 705/26 |
| 6,466,919 B1 | 10/2002 | Walker et al. | |
| 6,571,213 B1 * | 5/2003 | Altendahl et al. ............... | 705/1 |
| 7,136,830 B1 * | 11/2006 | Kuelbs et al. ................. | 705/27 |
| 2001/0032162 A1 * | 10/2001 | Alsberg et al. ................ | 705/37 |
| 2001/0056379 A1 * | 12/2001 | Fujinaga et al. ............... | 705/26 |
| 2002/0001372 A1 | 1/2002 | Katz | |
| 2002/0016744 A1 * | 2/2002 | Mitsuoka et al. .............. | 705/26 |
| 2002/0046130 A1 * | 4/2002 | Monteleone et al. .......... | 705/26 |
| 2002/0055878 A1 | 5/2002 | Burton et al. | |
| 2002/0065736 A1 * | 5/2002 | Willner et al. ................. | 705/26 |
| 2002/0095357 A1 | 7/2002 | Hunter et al. | |
| 2002/0143598 A1 | 10/2002 | Scheer | |
| 2002/0143692 A1 | 10/2002 | Heimermann et al. | |
| 2002/0188499 A1 * | 12/2002 | Jenkins et al. ................. | 705/10 |
| 2002/0188524 A1 * | 12/2002 | Shimizu ....................... | 705/26 |
| 2002/0188530 A1 | 12/2002 | Wojcik et al. | |
| 2003/0023497 A1 | 1/2003 | Broden et al. | |
| 2003/0023507 A1 | 1/2003 | Jankelewitz | |
| 2003/0069775 A1 | 4/2003 | Jollie et al. | |
| 2003/0110054 A1 | 6/2003 | Lindquist | |
| 2003/0171998 A1 | 9/2003 | Pujar et al. | |
| 2003/0178481 A1 | 9/2003 | Kondo et al | |
| 2003/0208415 A1 * | 11/2003 | Sano et al. .................... | 705/26 |

OTHER PUBLICATIONS

"Quixtar Inc. Selects Endeca InFront with Guided Navigation for Interactive Online Search". Business Editors/High-Tech Writers. Business Wire. May 12, 2003 [receovered from Proquest database Jan. 15, 2006].*

(Continued)

*Primary Examiner*—Jeffrey A. Smith
*Assistant Examiner*—William J. Allen
(74) *Attorney, Agent, or Firm*—Warner Norcross & Judd LLP (57) ABSTRACT

A method of submitting orders for products includes a customer preparing an order for submission to a supplier server. When the order is submitted to the supplier server, the supplier server determines whether the customer submitting the order is authorized to submit the order to the supplier. If not, the supplier server forwards the order to another customer who is authorized to submit the order. After forwarding the order, the order may be consolidated with other orders for resubmission to the supplier server.

3 Claims, 7 Drawing Sheets

OTHER PUBLICATIONS

"Good things, smaller packages". Bowman, Robert J. World Trade v6n9 pp. 106-110. Oct. 1993. ISSN: 1054-8637 Journal Code: WLD Document Type: Journal article Language: English Length: 3 Pages. [recovered from Qialog Database on Apr. 21, 2008].*

"Intranet helps Knight-Ridder centralize buys". Sliwa, Carol. Computerworld v32n1 pp. 53-54. Dec. 29, 1997-Jan. 5, 1998 CODEN: CMPWAB. ISSN: 0010-4841. Journal Code: COW. Document Type: Journal article Language: English Length: 2 Pages. [recovered from Qialog Database on Apr. 21, 2008].*

"A Look Through the PORTAL.(Internet/Web/Online Service Information)". Pickering, Chris. Software Magazine , 21 , 1 , 18 Feb. 2001. [recovered from Qialog Database on Apr. 21, 2008].*

* cited by examiner

METHOD FOR CONSOLIDATING ORDERS

BACKGROUND OF THE INVENTION

Due to the logistical complexities of unpacking and shipping, a main supplier of goods will often provide a discount if a buyer purchases case quantities of goods. For example, if a product comes twelve to a case, a supplier might give a five percent discount for each case purchased as opposed to the same number purchased as single quantities.

At the same time, some customers interested in purchasing goods are not allowed to purchase goods direct from the main supplier. Suppliers often restrict direct purchasers to those having a unique relationship with the supplier, such as those buying a large volume of goods or those with consistently high sales volumes. In those situations, the direct purchasers then may supply several other customers with goods.

The direct purchaser usually desires to purchase products in case quantities whenever possible in order to obtain a case discount offered by the supplier. However, if the direct purchaser supplies to a number of smaller or down-line customers, he may obtain several orders for products that are not in case quantities. Therefore, to obtain the case discount, the direct purchaser must consolidate the orders from the various customers in order to determine if a case discount is available. If the direct purchaser is processing numerous orders from many other customers, the direct purchaser may have great difficulty consolidating the order, and thus would not be able to take full advantage of case discounts, thereby increasing the cost of the goods to all customers.

A system and method for consolidating orders whereby the direct purchaser could automatically consolidate orders from other customers is thus highly desirable.

SUMMARY

In order to clarify the terms used herein: "Supplier" refers to an entity, such as a manufacturer of products, that sells goods to direct purchasers, registered clients and members and to independent business owners. A "direct purchaser" is a purchaser authorized to buy all types of goods from the supplier. A direct purchaser may buy goods from the supplier to resell to its own customers who may be members of the general public or to distribute those goods to down-line customers of the supplier. The term "customers" refers to all parties who may purchase items, directly or indirectly, from the supplier including direct purchasers and down-line customers. Customers may have up-line or down-line relationships among one another, but as they relate to the supplier, they are all customers. A "down-line customer" is one who is not authorized to purchase all types of goods from the supplier. "Catalog items" are offered for sale through the supplier from other suppliers or manufacturers by virtue of a business relationship between the supplier and the other suppliers or manufacturers and are items sold by the supplier to all customers. "Non-catalog items" are items sold by the supplier to direct purchasers but not to down-line customers. "Buyer" refers to all customers.

The aforementioned problems are overcome by an order consolidation system. A buyer submits to the supplier's computer an order for goods. A computer program operating on the supplier's computers examines the list of ordered goods. For ordered goods that are catalog items, the supplier's computer approves that portion of the order for fulfillment. For ordered goods that are non-catalog items, the supplier's computer then determines if the buyer is a direct purchaser. If the buyer is a direct purchaser, the order is fulfilled. If the buyer is not a direct purchaser, then that portion of the order for the non-catalog goods is forwarded to a direct purchaser.

The direct purchaser may consolidate the order immediately with other orders, or may store the order for later consolidation. To consolidate the order, the direct purchaser enables a computer program running on its computer. The order is entered into the computer program. The program then determines the quantity of each non-catalog item ordered, and then adds that quantity to the quantity currently compiled by the direct purchaser. The program then examines whether the total quantity exceeds the case quantity for that item. If so, then the program determines the number of cases and the number of single quantities of the item necessary to fulfill the order. After all orders have been consolidated, the direct purchaser then submits the final consolidated order to the supplier.

Due to the automation of this task, the time and difficulty of performing the task is minimized. Further, the fulfillment of orders is streamlined, allowing for the direct purchaser to more timely provides the goods to buyers.

DETAILED DESCRIPTION OF THE DRAWINGS

Figure 1:
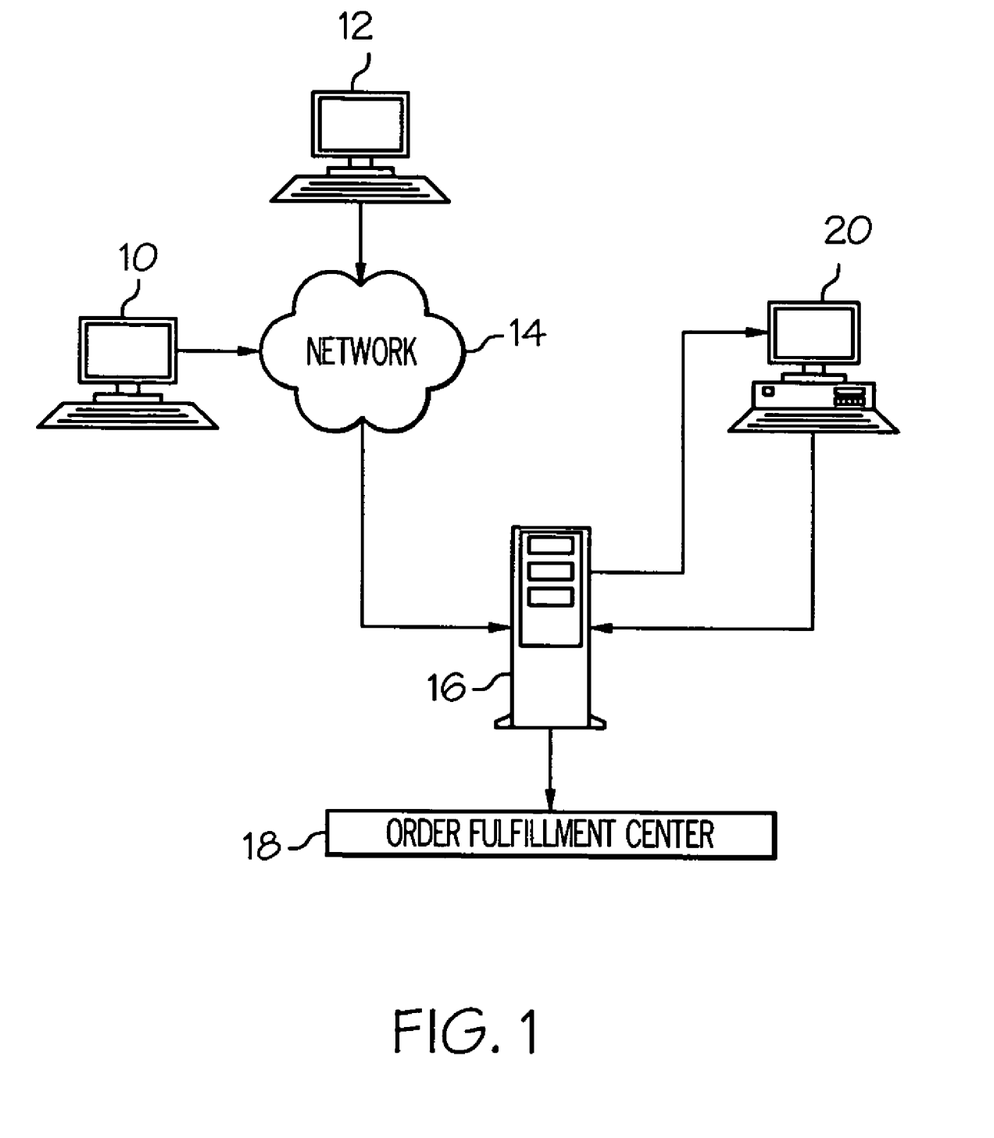
FIG. 1 shows an Internet based system for order entry and order consolidation.

FIG. 1 shows an Internet based system for order entry and order consolidation. First, a down-line customer creates an order by way of a computer. Down-line customer computers 10, 12 are coupled with server 16 by way of network 14. Herein, the phrase "coupled with" is defined to mean directly connected to or indirectly connected with through one or more intermediate components. Such intermediate components may include both hardware and software based components. Server 16 is coupled with order fulfillment center 18. Server 16 is also coupled with direct purchaser computer 20. Direct purchaser computer 20 may be directly connected to server 16 or may also be coupled with server 16 by way of network 14. Server 16 maintains a database containing the identity of direct purchasers.

Figure 2:
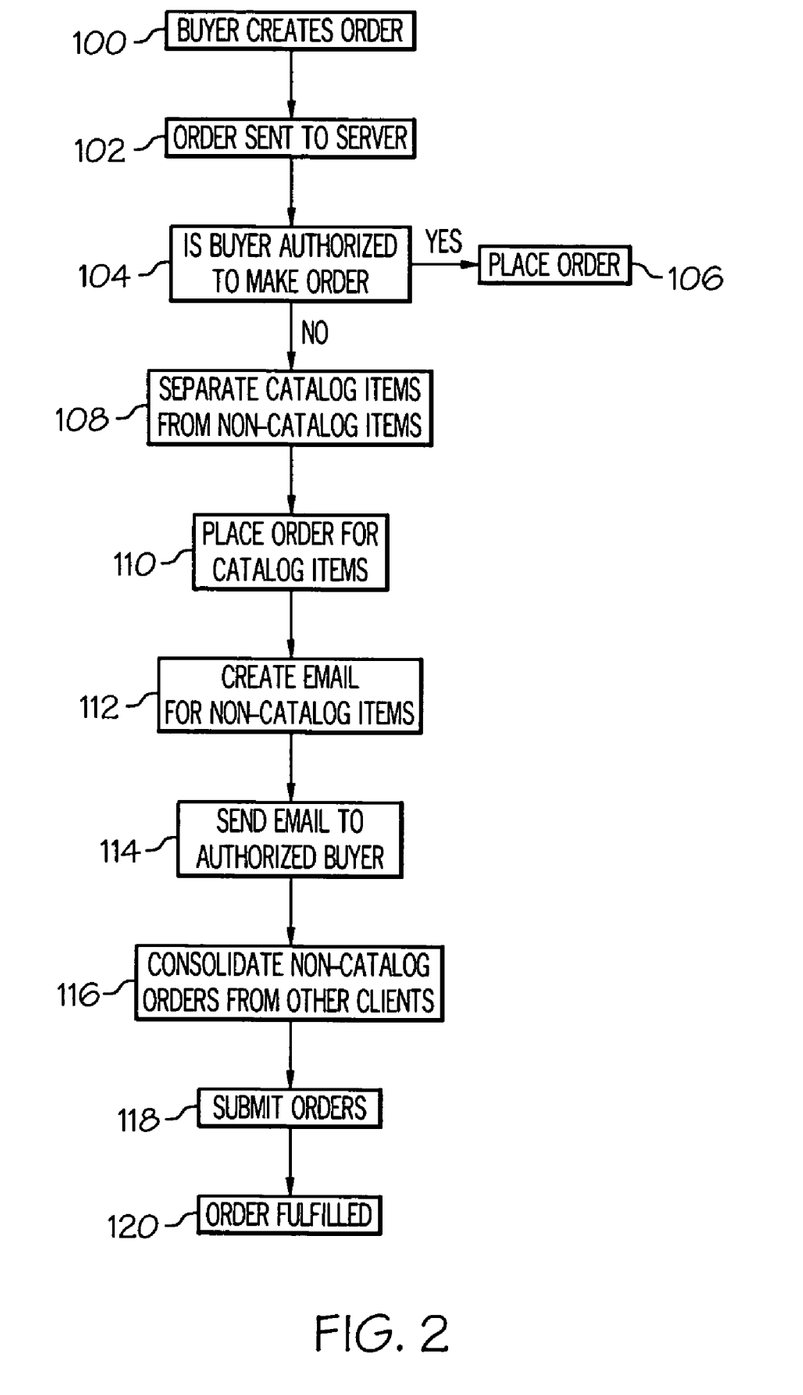
FIG. 2 shows a method for placing orders.

FIG. 2 shows a method for placing orders by way of the system shown in FIG. 1. The Buyer creates an order by way of computers 10, 12. Step 100.

Figure 3:
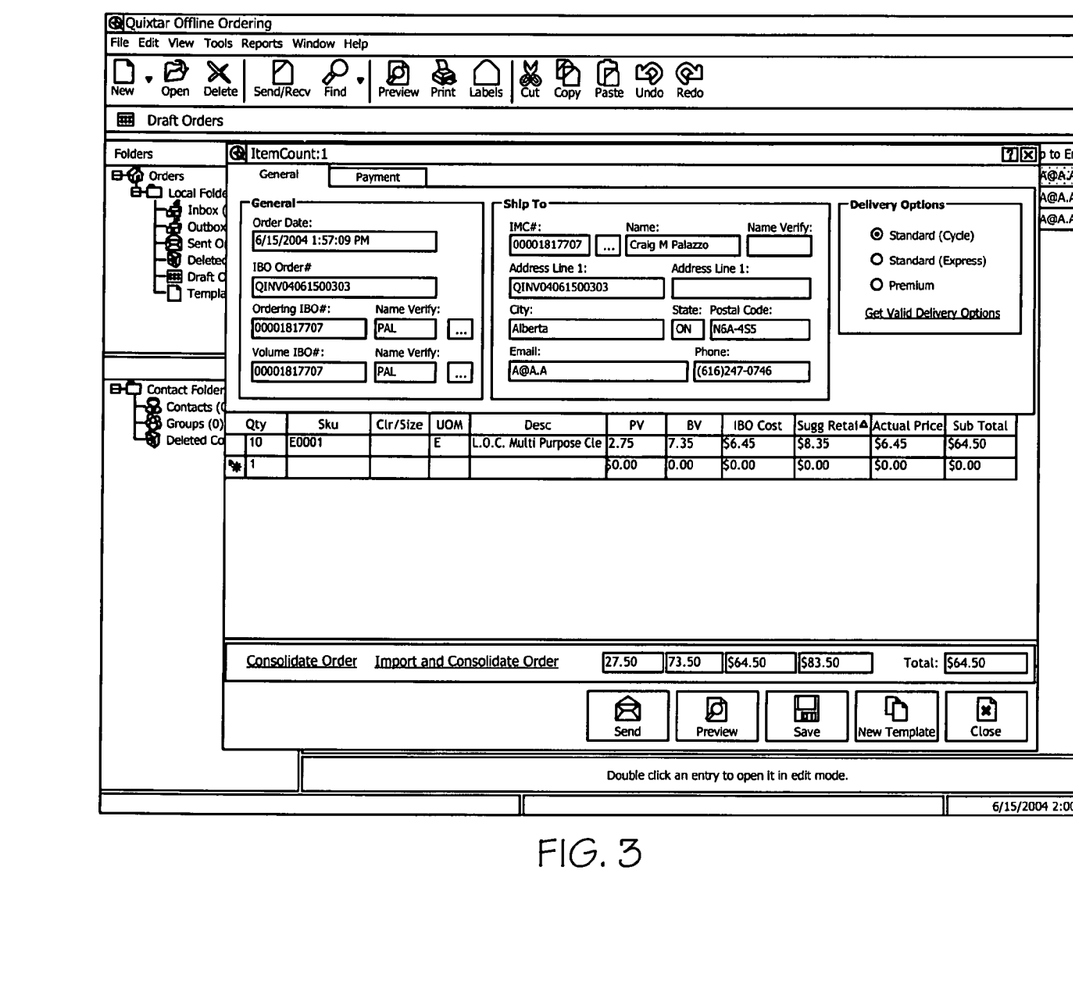
FIG. 3 illustrates an example of the creation of an online order.

FIG. 3 is an example of the creation of an online order by either a down-line customer or a direct purchaser. Information such as "ship to" address, order number, and delivery is entered on the form. The quantity of goods order and the SKU (stock keeping unit) number are also entered. When the SKU number is entered, the order entry program displays information regarding the order product such as cost and suggested retail price. The user is given several options such as saving the order, previewing the order and sending the order. When the order is in an acceptable form, the user sends the order to server 16. An email is used to send the order to the server.

Obviously, many different methods could be used to send the order to the server, such as by way of FTP (file transfer protocol).

Upon receipt of the order from the server, the server determines if the order is from a direct purchaser. Step 104. If so, the server places the order. Step 106. If not, the server separates the order into catalog items and a non-catalog items. Step 108.

The order for the non-catalog orders is then placed with order fulfillment center 18. For non-catalog items, the server constructs an email regarding the non-catalog component of the order. Step 112. The email is then sent for processing to direct supplier computer 20. Step 114. As mentioned previously, various methods other than email could be used to provide this information to the direct supplier.

The order is received by direct purchaser computer 20. The order is retained at direct purchaser computer 20 until the direct purchaser desires to consolidate orders from various down-line customers and places the order with the supplier. The direct purchaser could consolidate its own orders as well.

Figure 4:
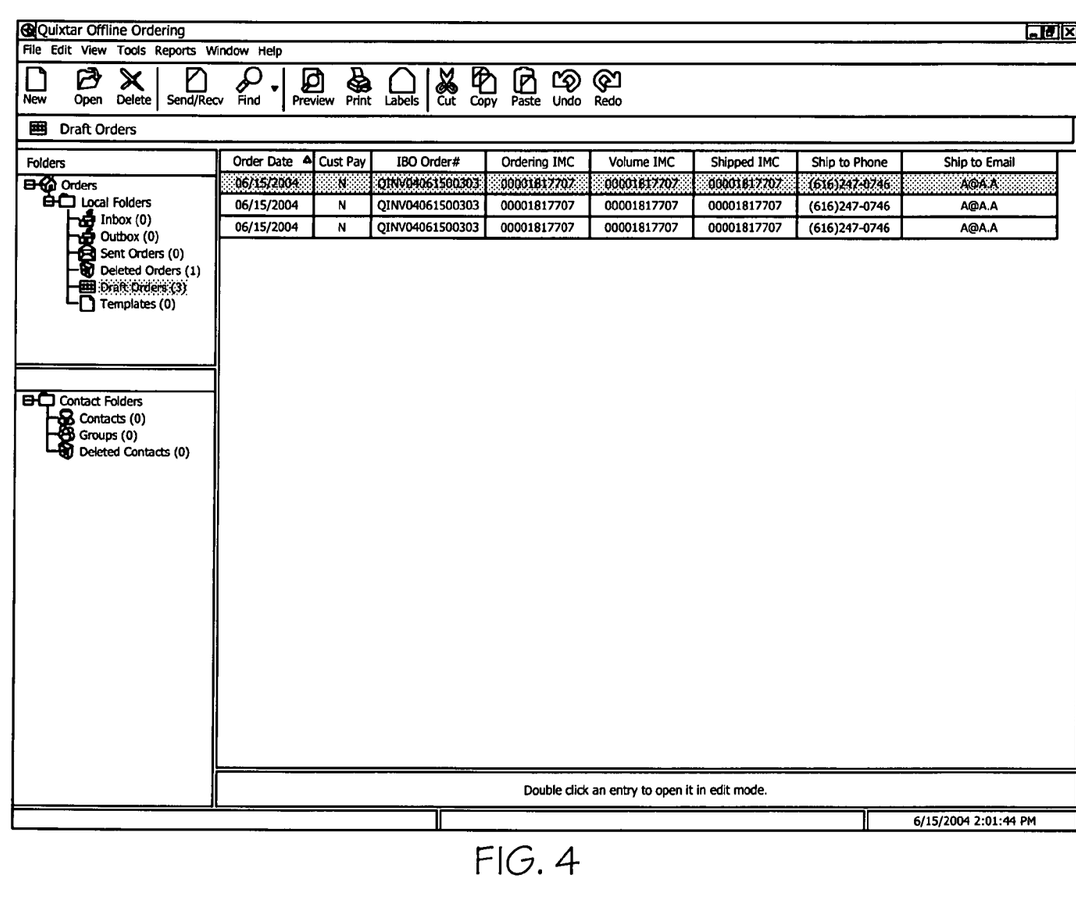
FIG. 4 is a screen shot showing order consolidation.

In order to consolidate the orders, the direct purchaser first initiates the ordering program. The direct purchaser opens the email from the down-line customer. After reviewing the order, the direct purchaser can then consolidate the order. Step 116. FIG. 4 is a screen shot showing order consolidation.

Order consolidation can be performed by several different methods. For example, the direct purchaser can drag and drop the order from a down-line customer onto the ordering program. Alternatively, the direct purchaser can manually enter the order items into the order.

Figure 5:
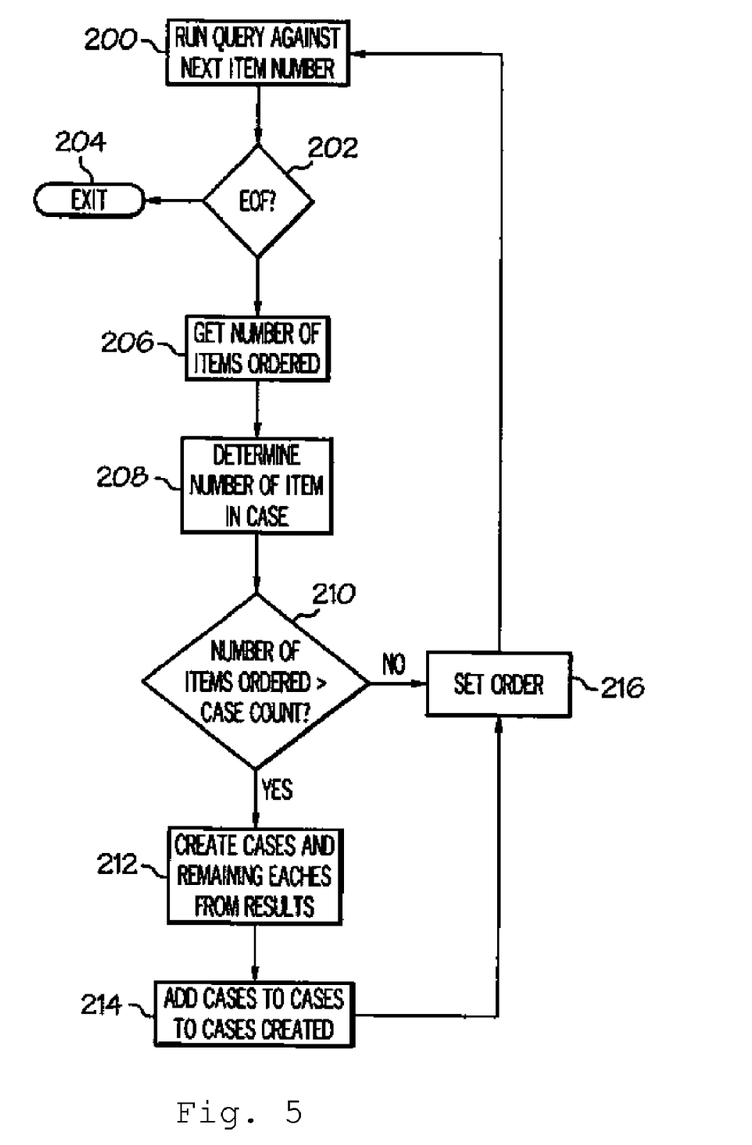
FIG. 5 is a flow chart showing the process used during order consolidation.
Figure 6:
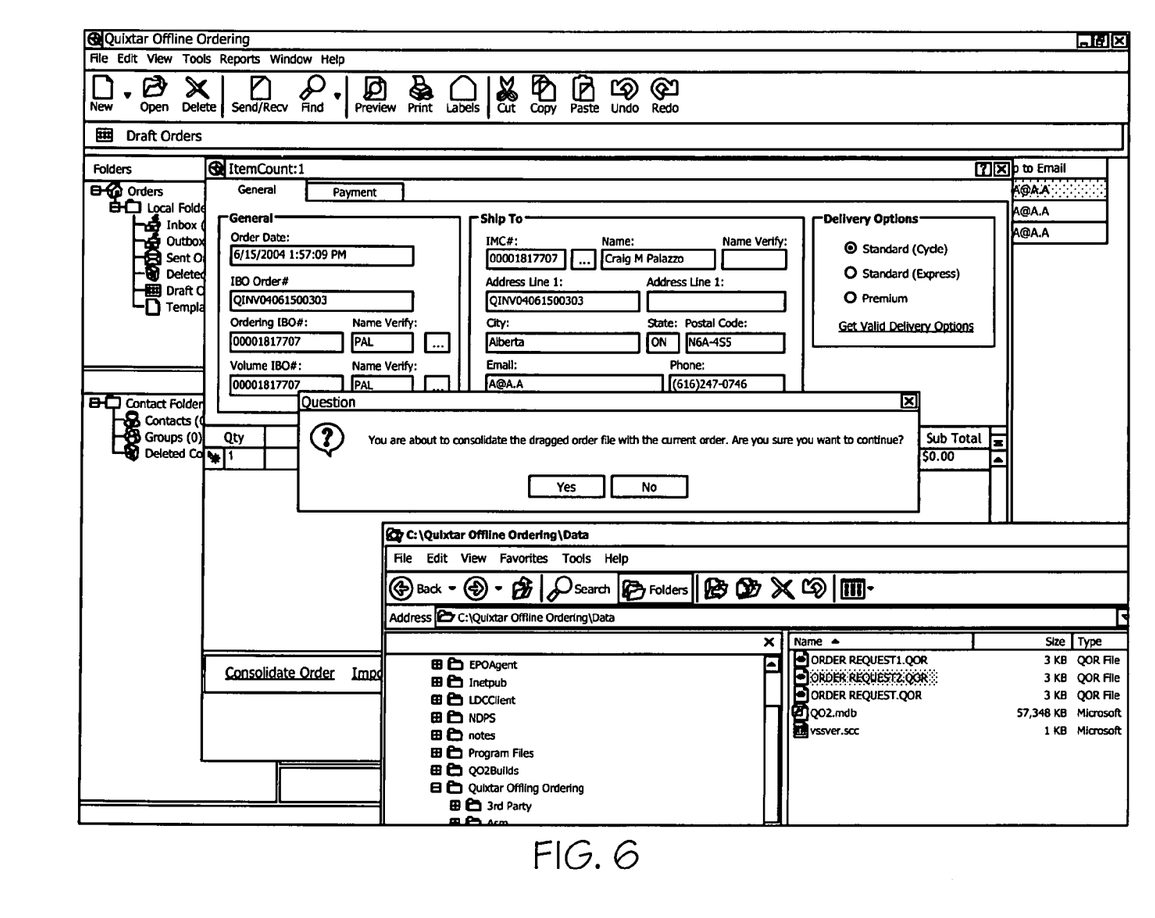
FIG. 6 is a screen shot showing an example of order consolidation.
Figure 7:
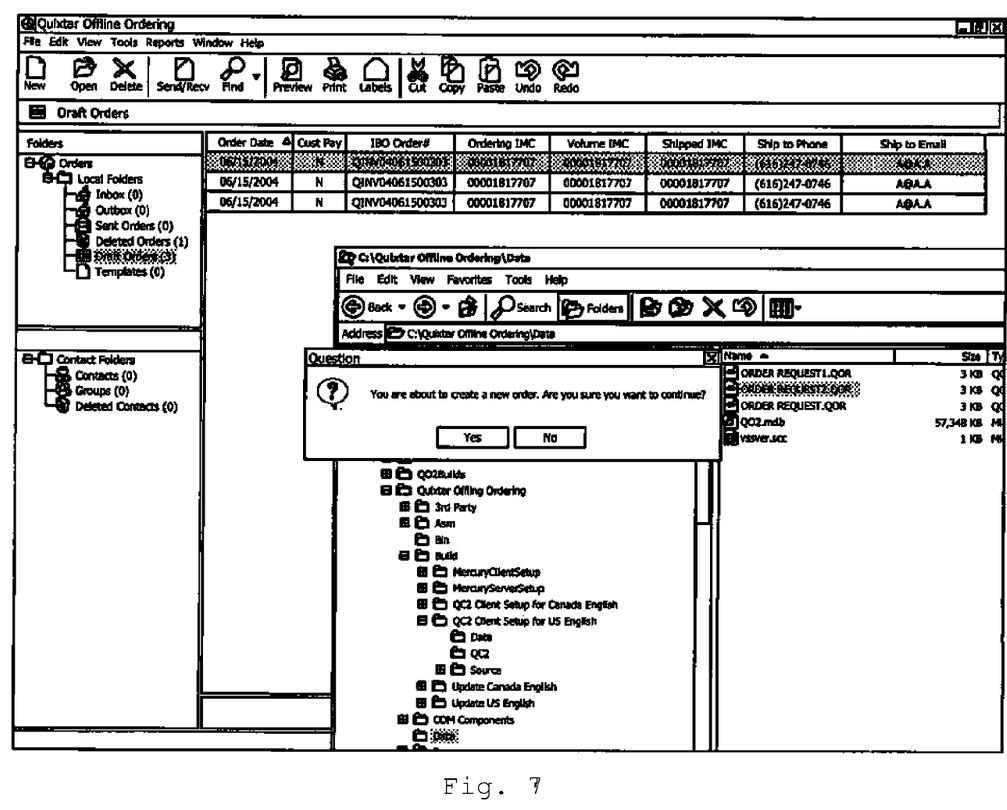
FIG. 7 is a screen shot showing an example of the creation of an online order.

FIG. 5 is a flow chart showing an automated process used during order consolidation. First, the query is run against each item number. Step 200. If there are no additional items, the process terminates. Steps 202, 204. Otherwise, the existing order is searched to determine if the item number is on the existing order. Step 206. If the item is not found in the existing order, the process goes to the next order.

If the item number is on the existing order, then the number of items within each case of that particular item is found. Step 208. The quantity ordered is compared to the number of items within a case. Step 210. If the quantity ordered is greater than the number of items within a case, then an appropriate number of cases are indicated as well as a corresponding number of "eaches" for the item. Step 212.

An "each" is a single unit of an item. "Eaches" refers to a quantity less than a case of a particular item. For example, if the number of items ordered is fifteen, and a case of those particular items is six, then the order would indicate an order of two cases along with three eaches. The case and the remaining eaches are then added to the order. Step 214. In this manner, the number of cases and eaches is set at the amount that allows for the greatest supplier discount.

Returning to FIG. 2, after consolidation of the orders (Step 116), the order to the supplier is submitted. Step 118. The order is then fulfilled. Step 120.

In this manner, a direct supplier as well as the down-line customers buying from the direct supplier are provided the most favorable pricing available. (assuming the direct purchaser passes on the pro-rata savings to each customer. Thus, all of the supplier's customers will have access to better pricing. The process is also less time intensive than previous order consolidation methods.

EXAMPLES

Example 1

In a Multi-Level Marketing (MLM) sales arrangement, independent business owners (IBOs) are business entities that are independent of the supplier, but may buy and resell products from the supplier. There are two types of fulfillment relationships between the IBOs and the supplier. The first IBO has a standard fulfillment relationship meaning that the first IBO is authorized to purchase catalog items directly from the supplier, but is not authorized to purchase non-catalog items directly from the supplier. The first IBO is a down-line customer of supplier as defined hereinabove. The second IBO has a direct fulfillment relationship with supplier. The direct fulfillment relationship authorizes the second IBO to purchase catalog and non-catalog items directly from the supplier. The first IBO must place order for non-catalog items through an IBO, such as the second IBO, having a direct fulfillment relationship with the supplier. The first IBO is a down-line customer of supplier as defined herein.

The first IBO initiates an order from a computer to the supplier's server. The order comprises three items. Items A and B are non-catalog items manufactured by supplier. Item C is a catalog item. Supplier's server determines that the first IBO is not authorized to order items A and B directly from supplier. The server accepts and supplier fulfills the order for item C. The server sends an e-mail message to the second IBO indicating that the first IBO has initiated an order for items A and B. The second IBO combines the quantity of items A and B ordered from the first IBO with the quantities of items A and B order from other down-line customers of the supplier through the second IBO and with the quantities of items A and B ordered by the second IBO for itself or its own customers.

The second IBO initiates the consolidation steps described herein and then places the order directly with the supplier via the supplier's server. The server verifies that the second IBO is a direct purchaser. The server accepts and supplier fulfills the order.

Example 2

In an MLM sales arrangement, a first IBO was recruited by a second, IBO. The second IBO is a direct purchaser, the first IBO is a down-line customer of a supplier. The first IBO has an order comprising items A and B that are non-catalog items manufactured by supplier and item C that is a catalog item. The first IBO submits an order for item C via computer to supplier's server. Supplier's server accepts and supplier fulfills the order for item C. The first IBO communicates to the second IBO that the first IBO has an order for items A and B. The communication may be by electronic message, telephone message, in-person or by standing order. The second IBO combines the quantity of items A and B ordered from the first IBO with the quantities of items A and B order from other down-line customers of the supplier through the second IBO and with the quantities of items A and B ordered by the second IBO for itself or for its own customers. The second IBO initiates the consolidation steps described herein and then places the order directly with the supplier via supplier's server. The server verifies that the second IBO is a direct purchaser. The server accepts and supplier fulfills the order.

Example 3

In a retail sales environment, a first customer submits an order for a quantity of a item A from a wholesale distributor. Wholesale distributor determines that first customer is not authorized to purchase products directly from wholesale distributor. Wholesale distributor notifies customer and a first direct purchaser geographically proximate to first customer of the product order. Direct purchaser consolidates the quantity of the item A ordered by the first customer with quantities of item A ordered from other different customers, and submits the consolidated order to wholesale distributor after the total quantity of item A meets or exceeds a quantity necessary to fill a case.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A method for consolidating a first order from a first buyer for a first quantity of a product with other orders from other buyers of the product, the method comprising:
   receiving the first order by a supplier for the first quantity;
   determining that the first buyer is not authorized by the supplier to purchase the product from the supplier in the first quantity and, in response to the determining that the first buyer is not authorized by the supplier, forwarding the first order to a direct purchaser authorized by the supplier;
   receiving at least one other order from at least one other buyer of the product for at least one other quantity, wherein the at least one other buyer of the product may include at least one other buyer not authorized by the supplier or the direct purchaser;
   consolidating the first order received by the direct purchaser with the at least one other order from the at least one other buyer of the product into a consolidated order;
   placing the consolidated order by the direct purchaser;
   determining an items per case for the product; and
   determining that the sum of the first quantity and the at least one other quantity equals or exceeds the items per case.

2. The method of claim 1 further comprising:
   in response to the determining the sum equals or exceeds the items per case, determining a case quantity indicative of the number of cases required to fulfill both the first order and the at least one other order; and placing an order for the case quantity.

3. The method of claim 2 further comprising: placing an order for single units of the product where the sum exceeds the case quantity.

* * * * *